June 22, 1948.                 H. COHEN                 2,443,949
                              TOWER OR MAST
                          Filed Aug. 31, 1944
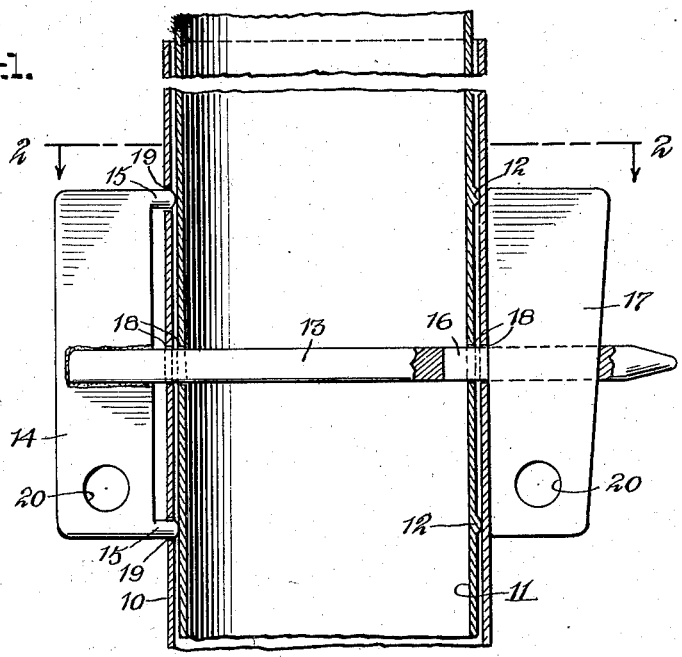
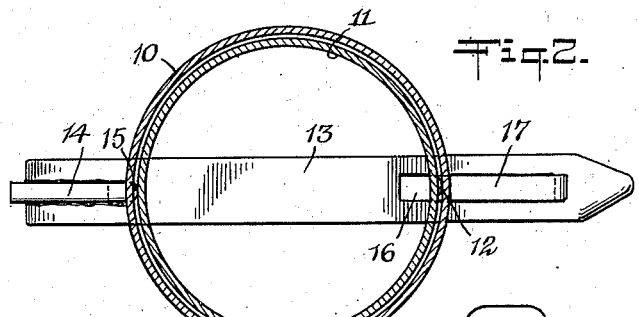
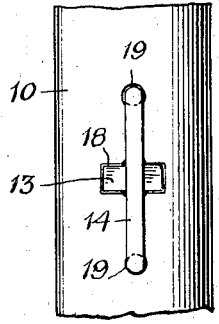
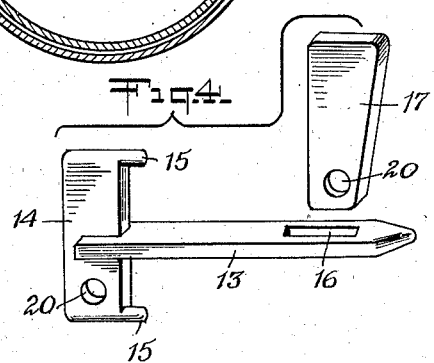
WITNESSES
Geo. W. Naylor
Chris Feinle
INVENTOR.
Harold Cohen
BY
Munn, Liddy & Glaccum
ATTORNEYS Patented June 22, 1948

2,443,949

UNITED STATES PATENT OFFICE 2,443,949

TOWER OR MAST

Harold Cohen, Elizabeth, N. J.

Application August 31, 1944, Serial No. 552,034

1 Claim. (Cl. 287—58)

This invention relates to the construction of towers, masts and analogous structures.

The principal object of the present invention is the provision of improvements whereby structural elements may be rigidly secured to each other even though there are inequalities in the cross-sectional sizes of such elements as they are manufactured.

A further object is the provision of improvements of the indicated character which enables the fabrication of the class of structures mentioned, and also enables them to be dismantled quickly and easily.

A further object is the provision of means of the indicated character which not only rigidly secures the components of a structure to each other, but also affords a good electrical connection between the parts in construction of towers and masts.

The nature of the invention and its distinguishing features and advantages will appear when the following specification is read in conjunction with the accompanying drawing, in which—

Fig. 1 is a fragmentary vertical sectional view showing telescoped structural elements rigidly secured in accordance with the invention.

Fig. 2 is a sectional view taken on the line 2—2 of Fig. 1.

Fig. 3 is a side elevational view.

Fig. 4 is a collective perspective view of the securing device.

In the drawing, there are shown tubular structural elements 10 and 11 which may constitute leg sections or components of a tower, mast or analogous structure. The elements 10 and 11 are arranged so that portions thereof telescope with respect to each other. In other words, the element 10 for a portion of its length surrounds the element 11 for a portion of its length.

In the manufacture of tubing to be used as structural elements, such as the elements 10 and 11, they are not always of uniform cross-sectional size to provide a close interfit of elements when telescoped. Hence, it is necessary to provide special means to obtain a rigid securement of one element to another.

In the present instance, one of the elements, the element 11 has lateral protuberances or projections 12 thereon in spaced relation to each other longitudinally thereof. Also, use is made of a securing device consisting of two main parts which cooperate with the protuberances or projections 12 to compensate for differences in the interior and exterior sizes or diameters of the respective elements 10 and 11. One of said parts consists of a cross-bar 13 having a clamping member 14 fixed on one end thereof in any suitable manner. The member 14 is disposed at a right angle with respect to the cross-bar and has laterally extending pointed projections 15 at or near the ends thereof. The cross-bar 13 has a longitudinal slot 16 therein near the other end thereof. The other main part 17 is wedge shape and adapted to be received in the slot 16 so as to be disposed at a right angle to the cross-bar 13 in opposition to the member 14. Each of the elements 10 and 11 has diametrically disposed holes 18 therein which register with each other in pairs to receive the cross-bar 13. The element 10 also has spaced holes 19 therein to receive the projections 15.

From the foregoing, it will be apparent that when the elements 10 and 11 are in the telescoped relation, the cross-bar 13 may be loosely extended through the elements 10 and 11 by reason of the holes 18, and the projections 15 may be entered into the holes 19. By inserting the clamping member 17 into the slot 16 and forcing it downwardly, said member 17 will cooperate with the cross-bar 13 while bearing on the element 10, to cause the projections 15 to bear on the element 11, and the projections 12 on the latter, to bear on the element 10. The cross-bar 13 also prevents endwise movement of the elements 10 and 11 with respect to each other. Thus, the elements 10 and 11 are rigidly secured in the telescoped relation. The various parts of metal and secured in the manner described afford good electrical connections desirable in towers and masts used to support radio aerials and antennae.

The members 14 and 17 each has a hole 20 to accommodate a guy line and such line applied to the member 17 aids in retaining it downwardly in its functioning position.

I claim:

A structure including tubular structural elements arranged in telescoping relation, one of said elements having projections thereon to bear on the other one of said elements, and a device to rigidly secure said elements in the telescoping relation, said device comprising a cross-bar which loosely extends transversely through said elements and preventing endwise movement of the elements with respect to each other, said cross-bar having a clamping member on one end, and a longitudinal slot therein near its other end, said clamping member having projections thereon extending through the outer and bearing on the inner of said elements, and a wedge shape clamping member receivable in said slot to cooperate with the cross-bar to cause the interengagement of the parts to rigidly secure said elements in the telescoped relation.

HAROLD COHEN.

REFERENCES CITED

The following references are of record in the file of this patent:

UNITED STATES PATENTS

| Number | Name | Date |
|---|---|---|
| 371,652 | Witherell | Oct. 18, 1887 |
| 703,925 | Horsley | July 1, 1902 |
| 1,699,276 | Boye | Jan. 15, 1929 |

FOREIGN PATENTS

| Number | Country | Date |
|---|---|---|
| 486,258 | Germany | Nov. 13, 1929 |